United States Patent [19]

Cottrell

[11] 4,209,112
[45] Jun. 24, 1980

[54] STICK FEEDING APPARATUS

[75] Inventor: Edward D. Cottrell, Cattaraugus, N.Y.

[73] Assignee: Champion International Corporation, Stamford, Conn.

[21] Appl. No.: 913,532

[22] Filed: Jun. 8, 1978

[51] Int. Cl.² .............................................. B65H 3/44
[52] U.S. Cl. ..................................... 221/93; 221/124; 221/266
[58] Field of Search ............... 221/265, 2??, 263, 264, 221/93, 124; 74/577 S

[56] References Cited

U.S. PATENT DOCUMENTS

| | | | |
|---|---|---|---|
| 1,610,717 | 12/1926 | Teabout et al. | 221/266 X |
| 2,592,005 | 4/1952 | Burke | 221/266 X |
| 2,858,046 | 10/1958 | Pollmann | 221/266 X |
| 3,048,132 | 8/1962 | Morgan et al. | 221/266 X |
| 3,737,072 | 6/1973 | Deitrick | 221/266 X |

Primary Examiner—Allen N. Knowles
Attorney, Agent, or Firm—Evelyn M. Sommer

[57] ABSTRACT

A stick feeding apparatus includes a storage hopper which feeds sticks one at a time past an agitating roller to a delivery chute. The delivery chute leads to a delivery roller having uniformly-spaced longitudinal recesses in its surface. The roller rotates within a housing having a stick inlet opening and a stick delivery opening. A hydraulically-powered or pneumatically powered driving apparatus steps the roller in one direction at a predetermined rate so as to deliver sticks at the delivery opening at a controlled rate. A plurality of delivery rollers, each supplied from its own hopper, may be mounted on a common shaft driven by a single hydraulic mechanism.

8 Claims, 7 Drawing Figures

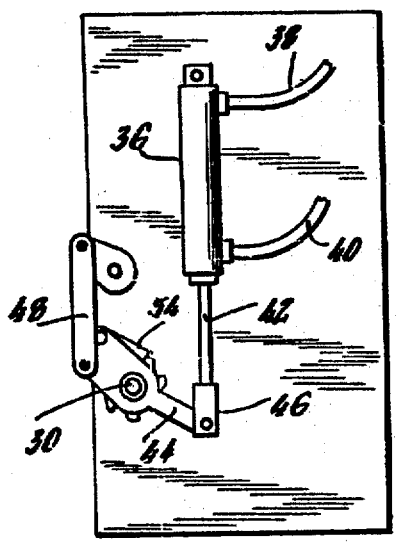
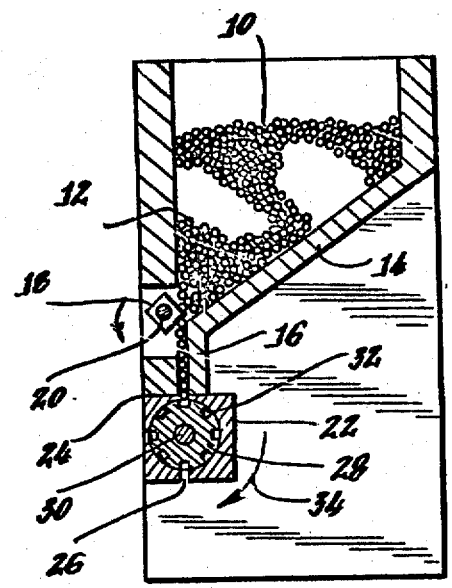
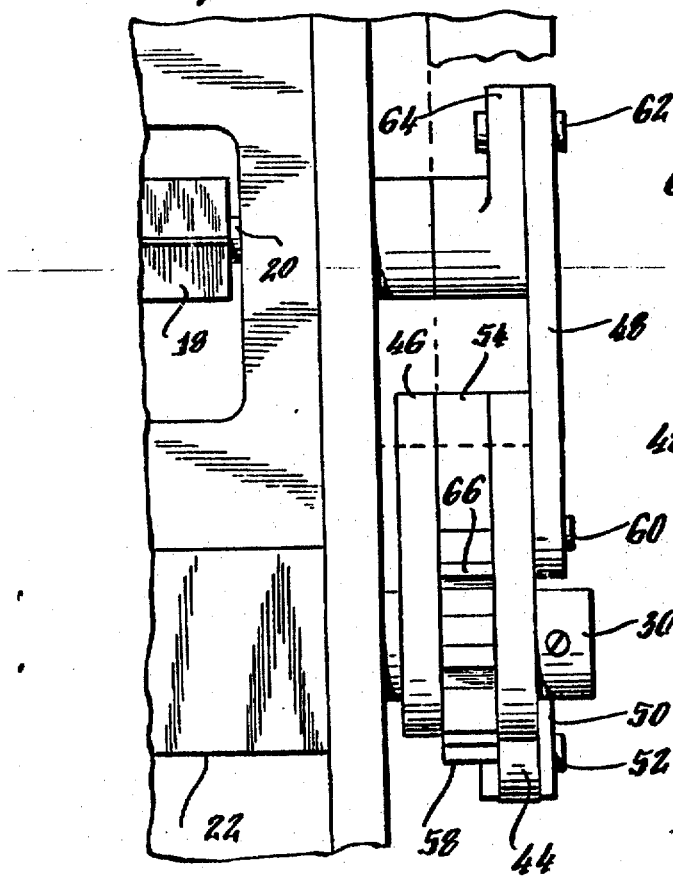
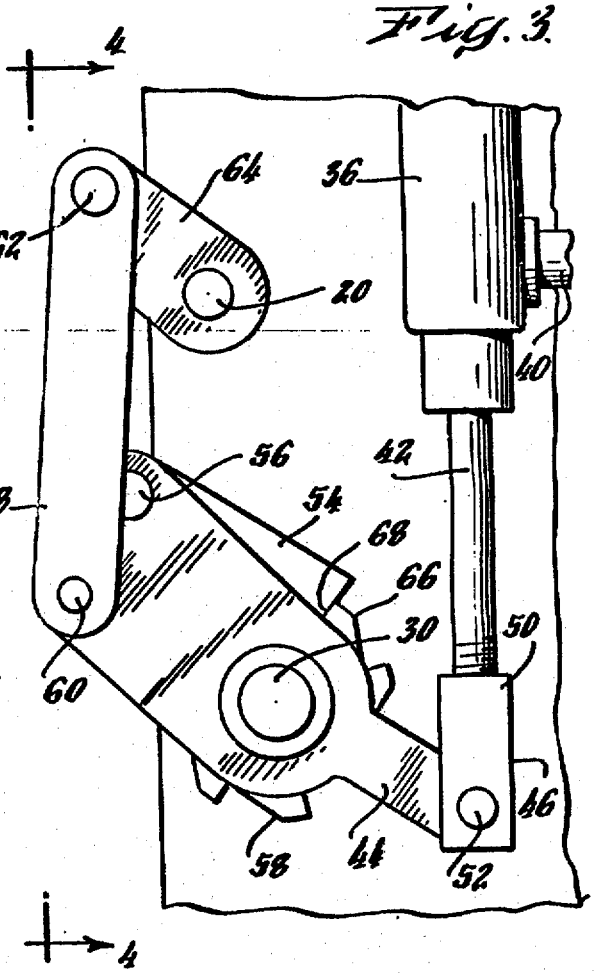

STICK FEEDING APPARATUS

BACKGROUND OF THE INVENTION

The present invention relates to stick feeding apparatus and more particularly to a stick feeding apparatus for delivering one or more sticks to predetermined positions at a readily controlled rate.

In the manufacture of stick-mounted food products, such as lollipops, large numbers of sticks must be delivered rapidly to product-holding molds.

Because manual insertion of sticks requires far too much time and labor, both of which lead to increased product cost, stick feeding apparatus have been developed in an effort to automate the delivery of such sticks.

One problem with known stick feeding apparatus is that such apparatus cannot be relied upon to consistently deliver sticks simultaneously to each mold in a large array of product-holding molds. Of course, if a stick is not delivered to a mold when it is supposed to be, the use of that mold is lost for at least one production cycle and product materials may be wasted. Moreover, the entire manufacturing process may be slowed since a defective product may have to be manually extracted from a mold while acceptable products may be automatically extracted.

As indicated above, it is important that a plurality of sticks be delivered simultaneously to the product-holding molds. If the stick feeding apparatus in use cannot be relied upon to provide simultaneous delivery, each stick feeding cycle must be long enough to assure that at least one stick is delivered to each mold.

Another problem encountered with prior art apparatus is that if the apparatus is adjusted to assure that a stick is delivered to each desired position, there is a chance that more than one stick will be delivered to a position during each cycle. This is not only wasteful of sticks but may also lead to an interruption in the manufacturing process as the unneeded stick is manually removed from the mold.

While some of the foregoing problems can be remedied by the use of costly and more complex feeding apparatus, the disadvantages of this approach are clear. Not only is the more complex apparatus more costly to begin with, it generally requires more maintenance.

SUMMARY OF THE INVENTION

The present invention is a low cost stick feeding apparatus for delivering sticks to a predetermined position at a controlled rate. The apparatus includes a delivery roller which has at least one stick-holding recess extending along the roller.

A storage hopper has converging side walls which define an entry to a delivery chute leading toward the delivery roller. The chute is wide enough to accept only one stick at a time. The delivery roller is almost completely surrounded by a housing which has a first opening for guiding a stick from a delivery chute to the surface of the delivery roller and a second, circumferentially-spaced stick delivery opening. A drive means is provided for rotating the roller at a predetermined rate to cause sticks to be transported from the first opening to the second opening at a controlled rate.

DESCRIPTION OF THE DRAWINGS

While the specification concludes with claims particularly pointing out and distinctly claiming that which is regarded as the present invention, further details of preferred embodiments of the invention may be more readily ascertained from the following detailed description when read in conjunction with the accompanying drawing wherein:

FIG. 1 is a cross sectional view through a stick feeding apparatus constructed in accordance with the present invention;

FIG. 2 is a view of the outer side wall of the apparatus of FIG. 1, showing the drive mechanism;

FIG. 3 is an enlarged view of a portion of the mechanism shown in FIG. 2;

FIG. 4 is a partial view taken along lines 4—4 of FIG. 3;

DETAILED DESCRIPTION

Figure 5:
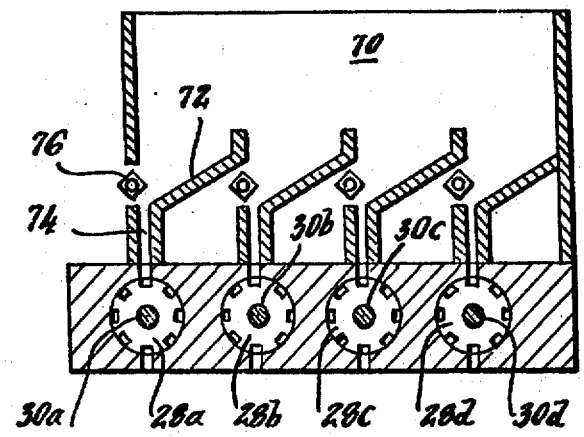
FIG. 5 is a cross sectional side view of an embodiment for feeding a plurality of sticks simultaneously to different predetermined positions.

Referring to FIG. 1, a stick feeding apparatus incorporating the present invention includes a storage hopper 10 in which a quantity of paper or wooden sticks 12 is loaded. The hopper 10 includes at least one converging side wall 14 which defines an entry to a stick delivery chute 16, the width of which is slightly greater than the diameter of the sticks 12 to ensure that only one stick at a time will enter the delivery chute 16. An oscillating agitating roller 18, mounted on a shaft 20, has a polygonal cross section to provide surfaces and edges which will jostle the sticks 12 to help maintain parallel alignment at the entry to the stick delivery chute 16.

The stick delivery chute 16 leads to a housing 22 having a first or stick inlet opening 24 and a second or stick delivery opening 26. The housing 22 partially surrounds a delivery roller 28 mounted on a shaft 30 and having a plurality of stick-receiving recesses (such as recess 32) extending along the surface of the roller 28. The roller 28 is driven intermittently in the direction indicated by arrow 34 to transport sticks received at the first opening 24 clockwise to the second opening 26. At the second opening, each stick will drop through the housing to a product-holding mold located immediately below the opening.

The agitating roller 18 and the design of storage hopper 10 assure that the delivery chute 16 is always loaded with sticks. The slotted delivery roller 28 picks up one stick at a time from chute 16 and transports that stick at a controlled rate through the housing 22 to the stick delivery opening 26. Since the rate of rotation of delivery roller 28 can be precisely controlled, the time of delivery of each stick can also be controlled with equal precision to assure that the stick will be delivered at the appropriate time in a manufacturing cycle.

Referring to FIG. 2, the delivery roller 28 and the agitating roller 18 are driven by a single drive mechanism which includes a cylinder 36 having a drive rod 42 which can be extended by admitting hydraulic fluid or air through a first tube 38 above a piston (not shown) while exhausting the cylinder interior below the piston through a second tube 40. The drive rod 42 can also be retracted by admitting the hydraulic fluid through tube 40 while tube 38 is used as the exhaust tube. Drive rod 42 is connected to a crank member 44 at a pivot point 46. The crank member 44, which rotates freely on shaft 30, steps the delivery roller 28 through angular increments of movement by means of a ratchet and pawl mechanism described in detail later. The crank member 44 also drives the agitating roller 18 through a crank arm 48, also described in more detail later.

Referring to FIGS. 3 and 4 together, the pivotal connection 46 between the crank member 44 and the drive rod 42 includes a threaded sleeve 50 which can be moved toward or away from the fixed end of the cylinder 36 to adjust the limits of movement of crank member 44 upon reciprocating movement of the drive rod 42. Sleeve 50 carries a pin 52 which extends through an aligned opening (not shown) at the right end of the crank member 44. As can be seen most clearly in FIG. 4, the component identified as crank member 44 actually consists of two parallel members 44 and 46, both of which pivot about the shaft 30. A pawl 54 is carried between the crank members 44 and 46 at a pivot pin 56. The pawl 54 rests on a ratchet wheel 58 which is secured to and rotatable with the shaft 30.

The crank arm 48 by which the agitating roller is driven includes an arm 58 connected to the crank member 44 at pivot pin 60. The upper end of arm 58 is connected through another pivot pin 62 to a lever 64, which is secured to the shaft 20 for the agitating roller 18 to prevent relative motion between the lever 64 and the roller 18.

The above-described drive mechanism operates in the following manner to drive the delivery roller 28 through predetermined angular increments in one direction while driving the agitating roller 18 in an oscillatory movement. When the drive rod 42 is retracted by applying hydraulic fluid through the tube 40, the crank member 44 pivots about shaft 30 in a counterclockwise direction. During this counterclockwise movement, the pawl 54 rides upward on the sloping surface, such as surface 66, of a tooth on ratchet wheel 58 while an overrunning clutch (not shown) operates to hold the ratchet wheel 58 and the shaft 30 stationary. At the same time, arm 50 is drawn downwardly to pivot lever 64 in a counterclockwise direction, thereby causing agitating roller 18 to rotate in a counterclockwise direction toward one extreme of an arc.

When the drive rod 42 is extended by admitting hydraulic fluid through tube 38, crank member 44 pivots in a clockwise direction about shaft 30. Pawl 54 engages one of the "vertical" surfaces 68 on a ratchet wheel tooth to push the ratchet wheel 58, shaft 30 and delivery roller 28 through a predetermined angular increment of movement in a clockwise direction. The angle through which the delivery roller 28 is driven at each stroke of drive rod 42 is preferably equal to the angle between adjacent recesses on the surface of roller 28 so that one stick is delivered during each drive rod cycle. However, the angular increment of movement could as readily be some integral submultiple of the angle between adjacent recesses so that an integral number of drive rod movement cycles would be needed in order to deliver each stick.

When the crank member 44 pivots about the axis 30 in a clockwise direction, the arm 58 is moved upwardly to drive the lever 64 to its original position but the agitator shaft 20 remains stationary owing to the action of an overrunning clutch (not shown) attached to hub of lever 64.

The preceding description has been simplified by assuming that the stick feeding apparatus is equipped with a single delivery roller. In practice, the apparatus would be provided with a plurality of delivery rollers for simultaneously delivering a plurality of sticks to predetermined positions. An embodiment of the invention capable of simultaneously delivering a plurality of sticks is described with reference to FIGS. 5 through 7. In this embodiment, a number of delivery rollers 28a, 28b, 28c, and 28d are mounted on parallel shafts 30a, 30b, 30c, and 30d, respectively. A common storage hopper 70 may be loaded with a large number of sticks to be fed to all of the identified rollers. The interior of the storage hopper includes converging side walls, such as side wall 72, each of which defines an entry to a stick delivery chute, such as chute 74. An agitating roller, such as roller 76, is mounted at the entry to each delivery chute. In a preferred embodiment, the delivery rollers 28a, 28b, 28c, and 28d are identical and are driven in synchronism about their respective axes to deliver sticks simultaneously at each stick delivery opening.

Figure 6:
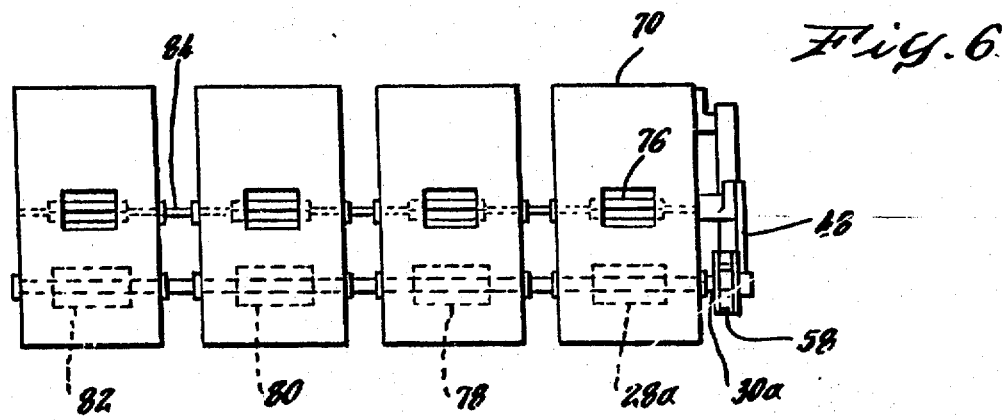
FIG. 6 is a simplified front view of the apparatus shown in FIG. 5.

Referring to FIG. 6, each of the shafts 30a, 30b, 30c and 30d may carry more than one delivery roller. For example, shaft 30a carries delivery roller 28a and three additional delivery rollers 78, 80 and 82, all of which are identical to each other and all of which are mounted on shaft 30a with stick-receiving recesses being in alignment along the length of shaft 30a. Since the recesses in the rollers 28a, 78, 80 and 82 are permanently aligned, it is assured that sticks will be delivered by all four rollers on shaft 30a simultaneously.

FIG. 6 also shows that the agitating rollers in each unit are preferably coupled each other through a common shaft 84 driven by the same drive mechanism which drives the common shaft 30a.

Figure 7:
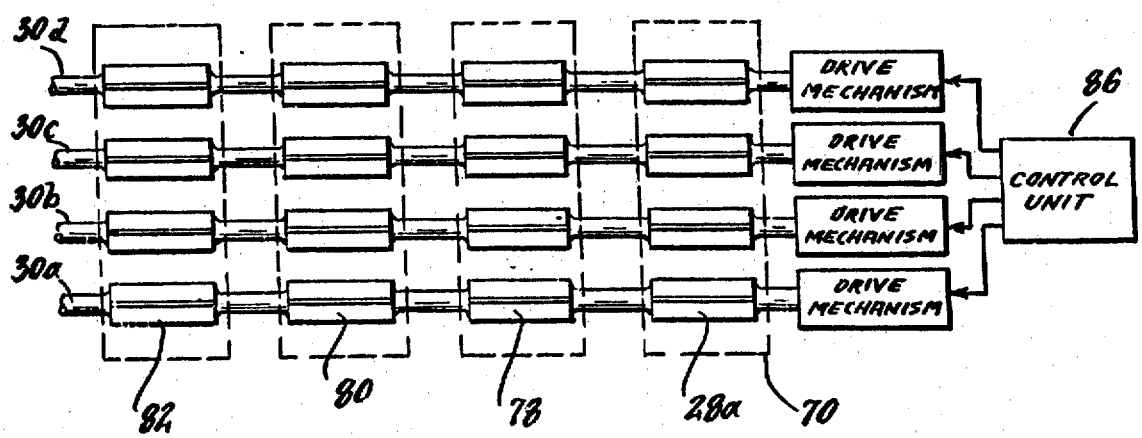
FIG. 7 is a simplified top view of the apparatus shown in FIG. 6, omitting the agitator rollers to simplify the drawing.

Referring to FIG. 7, each of the shafts 30a, 30b, 30c and 30d is provided with its own drive mechanism, such as the drive mechanism described with reference to FIGS. 1 through 4. A single control unit 86 is provided for synchronizing the operation of the various drive mechanisms to assure that the parallel shafts rotate in synchronism with one another. The drive mechanism to each of the shafts 30a, 30b, 30c and 30d includes a phase adjusting coupling for precise synchronization of the shafts plus a torque controlled overload coupling to prevent damage to the various mechanisms should a defective stick or foreign object cause a jam.

Since control unit 86 causes the individually driven shafts to rotate in synchronism, and since the individual delivery rollers on any one shaft necessarily operate in synchronism, the system is capable of delivering a large number of sticks simultaneously to each position in a predetermined array of positions.

While the unit illustrated in FIGS. 5 through 7 is capable of delivering only sixteen sticks simultaneously in a four-by-four array, it should be understood that both the number of parallel shafts and the number of delivery rollers per shaft can be increased to deliver a considerably greater number of sticks simultaneously.

While there has been described what are considered to be preferred embodiments of the invention, variations and modifications therein will occur to those skilled in the art once they become acquainted with the invention. Therefore, it is intended that the appended claims shall be construed to include not only the invention as described but also all such variations and modifications as fall within the true spirit and scope of the invention.

What is claimed as new is:

1. An apparatus for delivering sticks to a predetermined position at a controlled rate comprising:
   a hopper having converging sidewalls defining an entry to a delivery chute, said chute being wide enough to accept only one stick at a time;
   a delivery roller aligned with said delivery chute, said roller including a plurality of equiangularly spaced recesses extending along the length of said roller for receiving sticks from the delivery chute;
   a housing surrounding said delivery roller and having a first opening aligned with said delivery chute and a second opening adjacent the predetermined position, said housing acting to retain each stick in the roller recesses at positions intermediate the first and second openings;
   drive means for rotating said roller at a predetermined rate to cause sticks to be delivered to the second opening at the controlled rate, said drive means including means for driving said roller through predetermined angular increments of movement, said increments being equal to or integral submultiples of the circumferential spacing of the recesses in said roller, with said drive means further including,
   (a) a ratchet mechanism including a ratchet wheel secured to and rotatable with said delivery roller and a pawl intermittently engageable with said ratchet wheel to drive said delivery roller through the predetermined angular increment of movement; and
   (b) hydraulic drive means for reciprocating said pawl along an arcuate path; and
   a crank member freely rotatable about the delivery roller axis of rotation, said crank member being pivotally connected to said pawl at a first point and to said drive means at a second point, said drive means comprising a reciprocable hydraulically-driven rod for intermittently moving said crank member through a predetermined arc.

2. An apparatus defined in claim 1 further including an agitating member mounted within said hopper adjacent the entry to the delivery chute for agitating the sticks to reduce the chances of jamming, said agitating member comprising an agitating roller having a polygonal cross section and means for moving said agitating roller through a limited arc.

3. An apparatus as defined in claim 2 wherein said roller moving means comprises a crank connecting said agitating roller to said crank member.

4. An apparatus for delivering a plurality of sticks simultaneously to predetermined positions comprising:
   at least one shaft having a plurality of longitudinally spaced delivery rollers thereon, each of said delivery rollers including a plurality of equiangularly spaced, longitudinally-extending, stick-receiving recesses, the recesses in each delivery roller being longitudinally aligned with the recesses in each other delivery roller;
   a plurality of storage hoppers for supplying sticks to each of said delivery rollers, each of said hoppers having converging sidewalls defining an entry to a delivery chute which is wide enough to accept only one stick at a time, each said delivery chute being aligned with one of said delivery rollers;
   a plurality of housings surrounding said delivery rollers, each of said housings having a first opening for receiving a stick from said stick delivery chute and a second opening adjacent a predetermined position, each of said housings retaining each stick in its roller recess at positions intermediate the first and second openings;
   drive means for rotating said shaft to cause said plurality of rollers to simultaneously pick up and transport a plurality of sticks from the first opening to the second opening, said drive means including means for driving said shaft through predetermined angular increments of movements, said increments being equal to or integral submultiples of the circumferential spacing of the recesses in said delivery rollers, with said drive means further comprising,
   (a) a ratchet mechanism including a ratchet wheel secured to and rotatable with said shaft and a pawl intermittently engageable with said ratchet wheel to drive said shaft through each angular increment of movement; and
   (b) hydraulic drive means for said pawl; and
   a crank member freely rotatable about said shaft, said crank member being pivotally connected to said pawl at a first point and to said drive means at a second point, said drive means comprising a reciprocable hydraulically-driven rod for intermittently moving said crank member through a predetermined arc.

5. An apparatus defined in claim 4 further including a plurality of agitating rollers, each of said agitating rollers being mounted within one of said hoppers adjacent to entry to a delivery chute.

6. An apparatus as defined in claim 5 wherein each of said agitating rollers has a polygonal cross section.

7. An apparatus as defined in claim 6 wherein said agitating rollers are secured to a common, longitudinally-extending shaft, said shaft being connected to said crank member through a second crank.

8. An apparatus as defined in claim 4 further including at least one additional shaft parallel to said one shaft and carrying a plurality of delivery rollers and housings, and a separate drive means for each such additional shaft.

* * * * *